United States Patent [19]
Washburn et al.

[11] Patent Number: 5,989,486
[45] Date of Patent: Nov. 23, 1999

[54] APPARATUS FOR REMOVAL OF THE MERCURY FROM GRANULATED MATERIALS

[75] Inventors: Charles H. Washburn, Salt Lake; Charles O. Gale, Bountiful, both of Utah

[73] Assignee: Summit Valley Equipment and Engineering, Inc., North Salt Lake, Utah

[21] Appl. No.: 08/881,962

[22] Filed: Jun. 25, 1997

[51] Int. Cl.[6] .................................................. C22B 9/02
[52] U.S. Cl. .............................. 266/145; 75/670; 266/173
[58] Field of Search ................................ 266/145, 173; 75/670

[56] References Cited

U.S. PATENT DOCUMENTS

| 1,599,372 | 9/1926 | Reed | 75/670 |
| 5,569,154 | 10/1996 | Navetta | 75/670 |

Primary Examiner—Melvyn Andrews
Attorney, Agent, or Firm—Mallinckrodt & Mallinckrodt

[57] ABSTRACT

An apparatus for retorting granulated material containing mercury such as ores and precipitates wherein the granulated material is stirred by means of a plurality of paddles while under vacuum and at high temperature within a drum of the apparatus. The vaporized mercury is drawn from the drum and condensed for recovery thereof. Multiple retorting apparatuses can be used for a continuous retorting operation.

6 Claims, 6 Drawing Sheets

APPARATUS FOR REMOVAL OF THE MERCURY FROM GRANULATED MATERIALS

BACKGROUND OF THE INVENTION

1. Field

The field of the invention is retorting apparatus and methods for removal of mercury from ores and mercury contaminated materials.

2. State of the Art

Mercury is a toxic material to many living organisms, including humans, and its presence in ores or in other materials constitutes a hazard when such materials are processed. Thus extraction of valuable metals such as silver and gold from ores is often complicated by the presence of mercury. The mercury is generally in elemental form, or alloy form (amalgam), or as a sulfide and is easily vaporized. Since the refining of such ores often involves the application of heat, the mercury tends to change to highly toxic vapor.

Removal of the mercury by retorting involves the application of heat to the ore or other mercury bearing material to cause this vaporization. The ore is heated in a reduced pressure environment to accelerate the vaporization. However, although mercury is relatively easily vaporized by contact with high temperature gases such as air, it is difficult to create enough actual liquid mercury contact with the hot gases because both mercury vapor and liquid inherently resist migration through the ores, even though the ores are finely ground. Because of this characteristic, prior art methods of ridding ores of mercury by heating under vacuum is a slow process. The mercury bearing material must be spread very thinly upon trays or pans within the heating oven before the mercury can be thoroughly removed. The toxic nature of the mercury vapor adds to the difficulty of retorting using such pans. Access to the pans for manual stirring in the high temperature vacuum environment is virtually impossible. The oven must be shut down, and allowed to thoroughly cool before the trays can be removed and replaced with fresh unretorted material.

There is therefore a strong need for a method of retorting mercury bearing materials using elevated temperatures and lowered pressure which is not limited by the requirements of prior art retorts for treating only very thin layers of the material.

BRIEF SUMMARY OF THE INVENTION

With the foregoing in mind, the present invention eliminates or substantially alleviates the shortcomings and disadvantages in prior art apparatus and methods for retorting of ores and other materials to remove the mercury therefrom. The inventive apparatus and method provide for heating a quantity of mercury bearing materials in a generally closed chamber, lowering the pressure within the chamber to below atmospheric, and heating the material in the chamber, all while slowly stirring the material to continuously provide newly exposed surfaces for vaporization of contained mercury. This procedure virtually eliminates any delay in the progress of the vaporization because of the natural reluctance of mercury to migrate through granular materials. To purge the mercury vapor from the retort chamber, a small amount of air is caused to flow through the chamber, but in insufficient quantities to significantly effect the vacuum.

After the mercury vapor is thus purged from the retort chamber, it is passed through a screening device to remove any suspended solid material such as dust, and then lowered to mercury liquification temperature in a water jacketed condenser, from which the resulting liquid mercury passes to a receptacle for eventual collection. The original mercury bearing material is likely to contain water, which may be drained from the mercury collection vehicle from a level above that of the quite heavy liquid mercury. Any suspended mercury vapor escaping from the liquid mercury receptacle is further condensed in a vertical condenser, also under vacuum, and drains back into the mercury receptacle vessel.

In the preferred embodiment, the retort chamber comprises a horizontally disposed drum with a closeable uppermost port for filling the drum with granulated material. A lowermost closeable port is provided for removal of the retorted material for disposal, or further refining to recover any gold, silver, or other valuable metals.

Inside the heated retort chamber are a number of scoops or paddles mounted upon arms secured to a rotating central shaft journalled to the ends of the chamber. The scoops slowly stir and lift the granulated mercury bearing material as it is heated to above the mercury vaporization point and subjected to below ambient pressure. Heated high temperature oil flows through passages in a jacket installed around the retort drum to heat the drum and its contents.

According to another aspect of the invention, the retort drums may be utilized in groups of two or more for continuous operation. The loading of the drums from a supply of granular material may be switched to successive drums having overlapping operating periods. A single source of heat transfer medium could be used to heat all the drums.

Common condensers and mercury collection vessels could be used. The unloading of the retorted material would be sequenced similarly to the loading.

It is therefore the principal object of the invention to provide a method for retorting mercury from granular materials more rapidly and more thoroughly than has been until now possible.

BRIEF DESCRIPTION OF THE DRAWINGS

In the drawings, which represent the best modes presently contemplated for carrying out the invention.

DETAILED DESCRIPTION OF ILLUSTRATED EMBODIMENT

Figure 3:
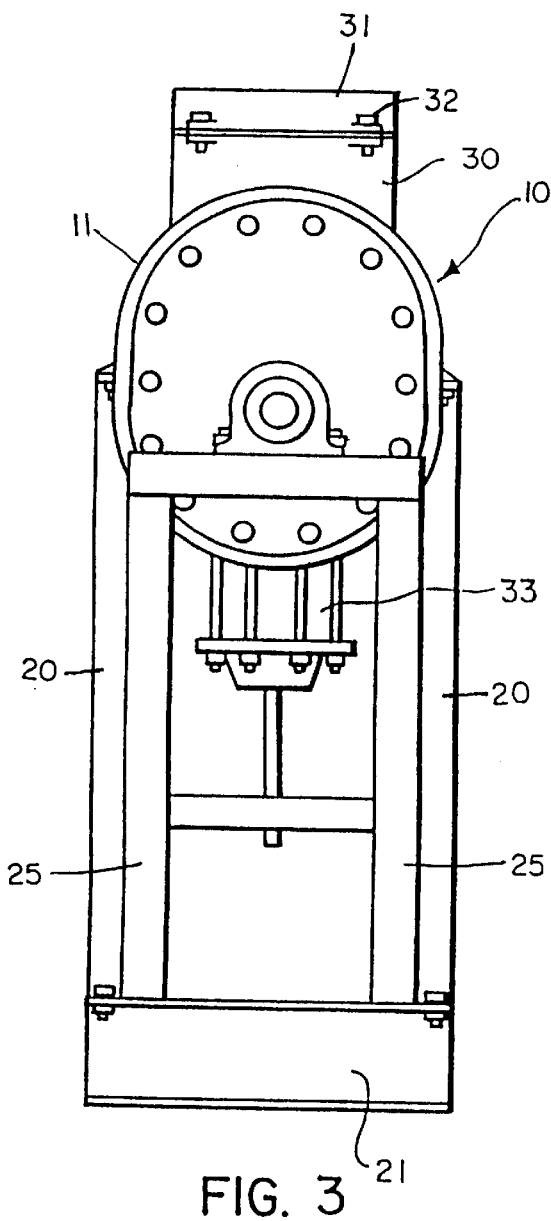
Figure 4:
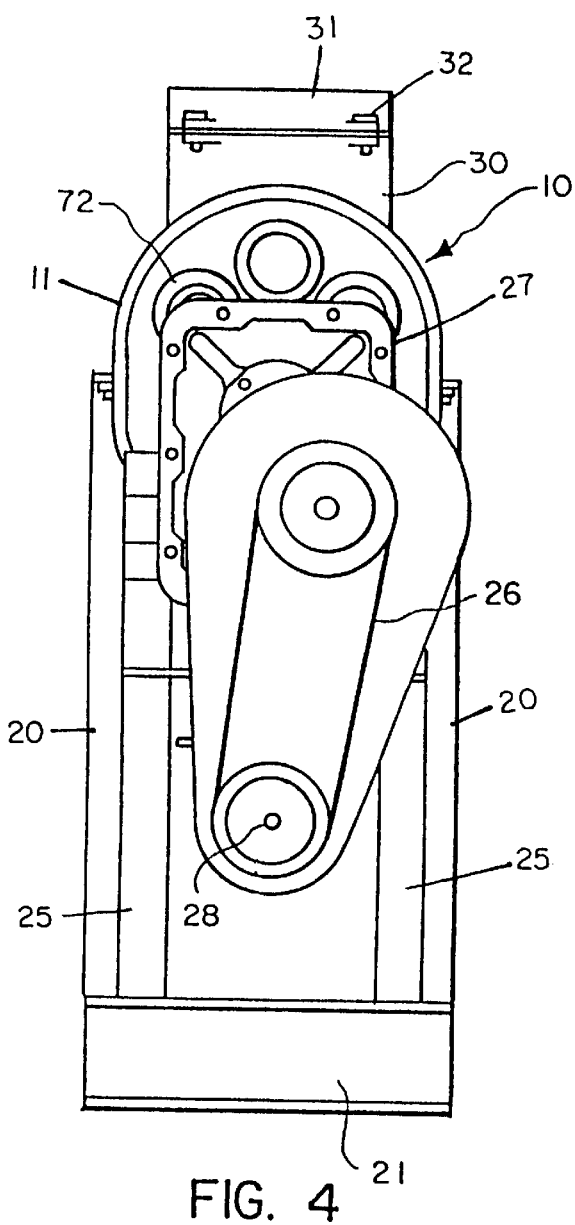

The inventive mercury retorting device 10 comprises a horizontally disposed drum 11 with vertically spaced apart hemispherical portions 12 and 13 integral with connecting planar shell portions 14 and 15, the latter however not visible. (FIG. 1) Drum end members 16 and 17 are secured to the shell 18, the former by weld 16w and the latter by bolt and nut assemblies 19 acting through a heavy flange 19f secured by welds 19w. Frame members 20 support drum assembly 18 upon, for example, a steel skid assembly 21. (FIGS. 2–4) At each of the drum ends 16 and 17, a vacuum sealed bearing block 22 journals an elongate shaft 23 which may further extend at each end also to a bearing block 22f mounted upon a vertical support 25 outside each end of drum assembly 11. Shaft 23 is rotatable, as by chain 26 connecting a gear reducer 27 to output shaft 28 of a motor 29 mounted upon one of the exterior bearing block supports 25. As will be explained subsequently, the shaft 23 rotates slowly during operation of the retort device 10.

At the top of retort shell 18, a filling hatch assembly 30 is provided, having a removable and securable lid 31 with hasps 32. Directly opposed to filling hatch assembly 30 an emptying hatch assembly 33 is secured to the bottom of the retort drum 11. A manually operated ball valve 34 is secured to outlet hatch 33 by elongate bolt and nut assemblies 35, and is operated by handle assembly 36.

Nipples 72 installed upon drum end 16 enable connection with mercury vapor piping to associated condenser 55, and permit sweep of mercury vapor from drum 11 by injection of small amounts of air, or other gases inert to mercury. The illustrated nipple 72 for removal of the mercury vapor is advantageously associated with a vapor inlet pipe 73 having numerous orifices 74.

Drum shell 18 comprises an innermost sheet metal member 37 surrounded by a drum jacket 38 comprising an outer drum shell 39, with connecting members 40 defining passages 41 between the two shells for heating of the inner shell 37 and its contents, during operation. Exterior to the outer drum shell 39 is a further exterior shell 43 of light gauge metal fragmentally shown in FIG. 1. The space between the exterior shell 43 and the jacket shell 39 is filled with 2 inch thick fiber insulation 39i all around.

Inside innermost shell member 37, a number of paddles 44 are each supported through arms 45 radially outstanding from shaft 23 spaced therearound. Connecting clamps 46 hold the support arms 45 rigidly in place. Preferably, the arms and scoops are installed at angles to each other, to assure thorough mixing, as subsequently described.

With a paddle type mixer, such as is available from Marion Mixers, of Marion, Iowa, the paddles sweep as close as 0.02" to the bottom of drum 11.

Figure 5:
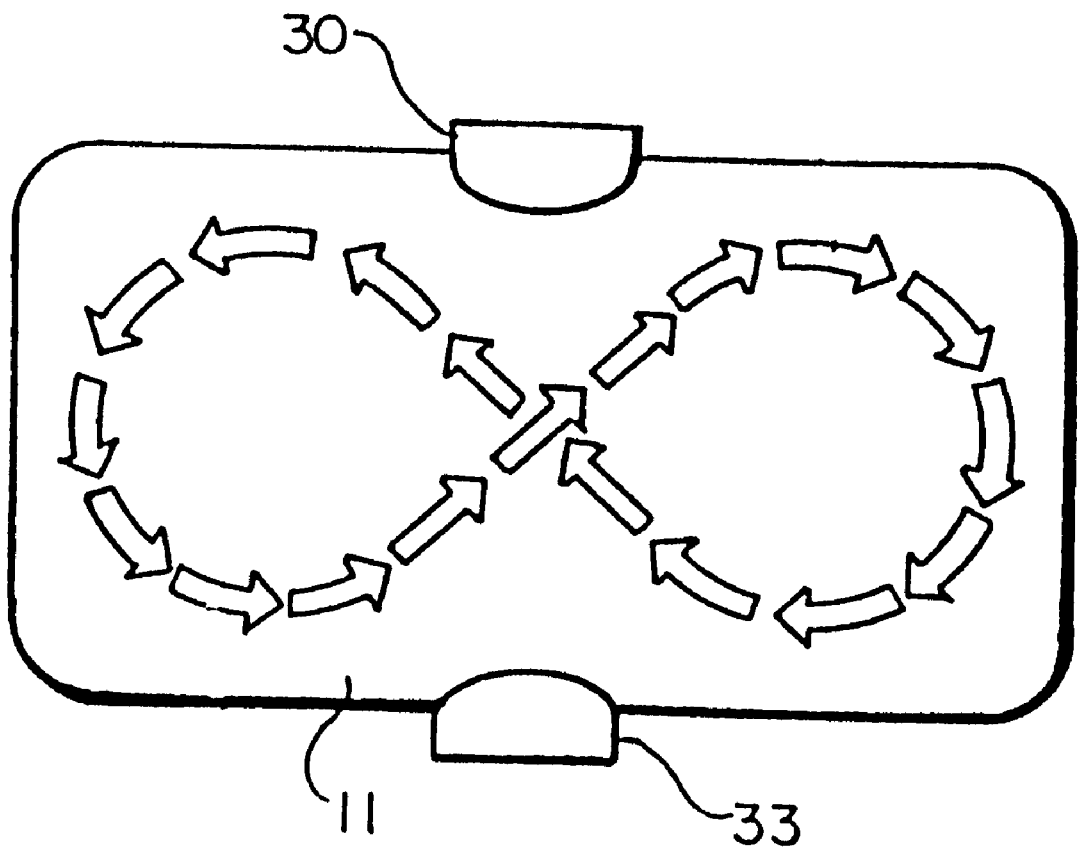

The granular material 42 is not only lifted to the surface, but also circulated longitudinally to retort drum 11 as indicated in FIG. 5 by arrows 42p, if the paddle type mixer is used. This circulation to the center greatly aids in the complete emptying of drum 11 after the material is completely retorted.

During operation, shaft 23 is slowly rotated by motor 29 acting through drive chain 26, moving the material being retorted upwardly to be exposed to the hot gas atmosphere within the drum 11. This atmosphere is principally of air and water from the granular material. Thus the necessity for mercury vapor or liquid mercury to migrate through the granular material to reach the surface before being vaporized is eliminated.

Figure 1:
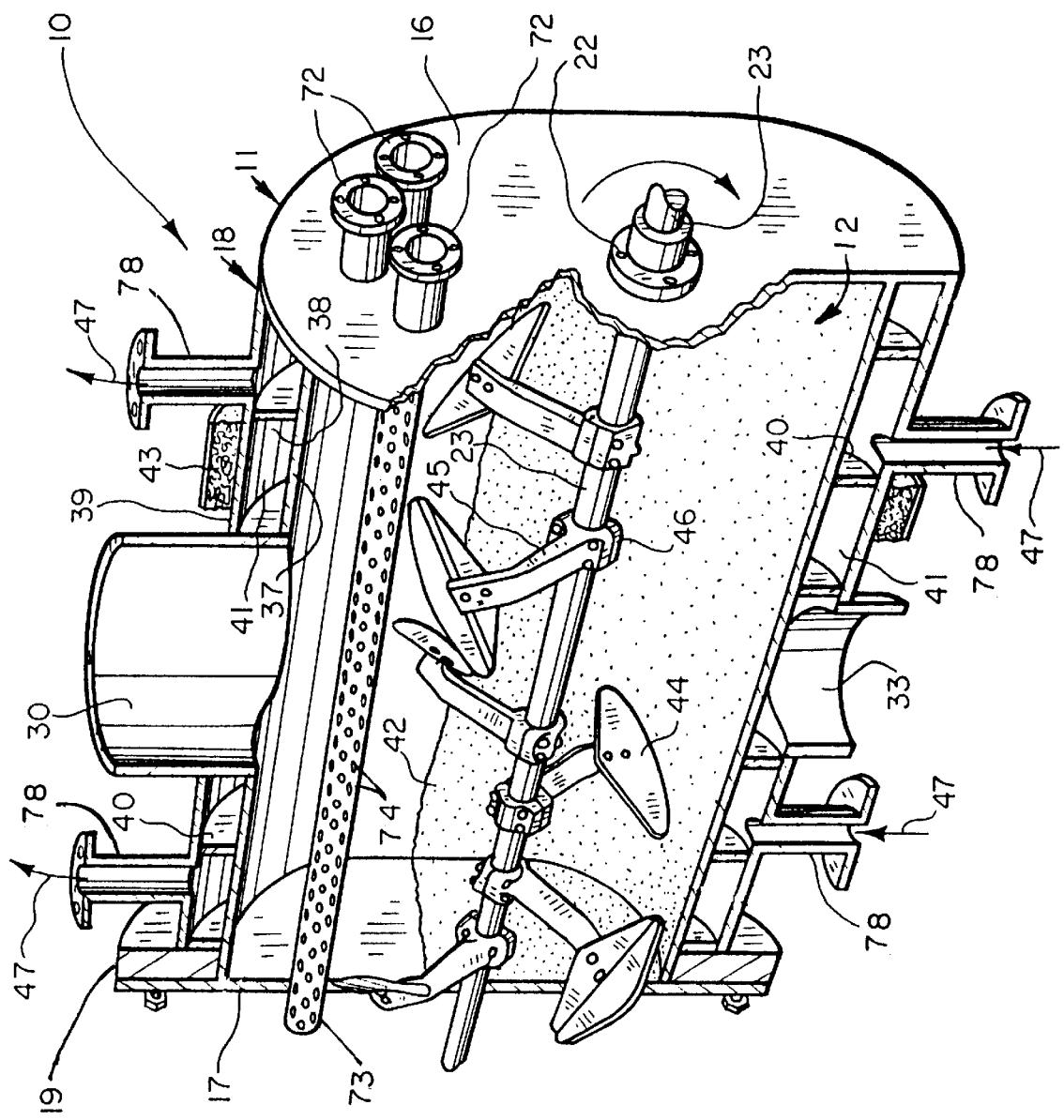
FIG. 1 is a perspective view of a vertical section through the retorting drum of the retorting device of the invention, drawn to a reduced scale, FIG. 2 a side elevation view of the retorting chamber of the invention showing general placement of the parts thereof, drawn to a reduced scale, FIG. 3 an end elevation view of the device of FIG. 2, drawn to the same scale, FIG. 4 an elevation view of the end of the device opposite to that of FIG. 2, drawn to the same scale, FIG. 5 a diagrammatic representation of the flow pattern of the particulate matter within the retort during operation thereof, FIG. 6 a schematic representation of the use of the retort of the invention, shown in conjunction with auxiliary heating, condensation and mercury collection receptacles, and FIG. 7 a schematic representation of a portion of a multiple retort setup for continuous retorting application.

The retorting material 42 and the atmosphere in drum 11 is heated by circulation of high temperature oil 47 through the passages 41 between inner and outer shells 37 and 39 respectively. (FIG. 1) Holes 40h provided through the members 40 assure even circulation for uniform heating. The oil is stored in a tank 48 with inert nitrogen gas 48n blanketing its surface. From tank 48, the heated oil 47 is transferred through pump 49. An electrical heating element 51 raises the oil temperature to about 650° F. From heater 50, the hot oil moves through insulated tubes 52 to flow through nipples 52n and thence through the passages between the shells of retort drum 11. (FIGS. 1 and 6)

Figure 6:
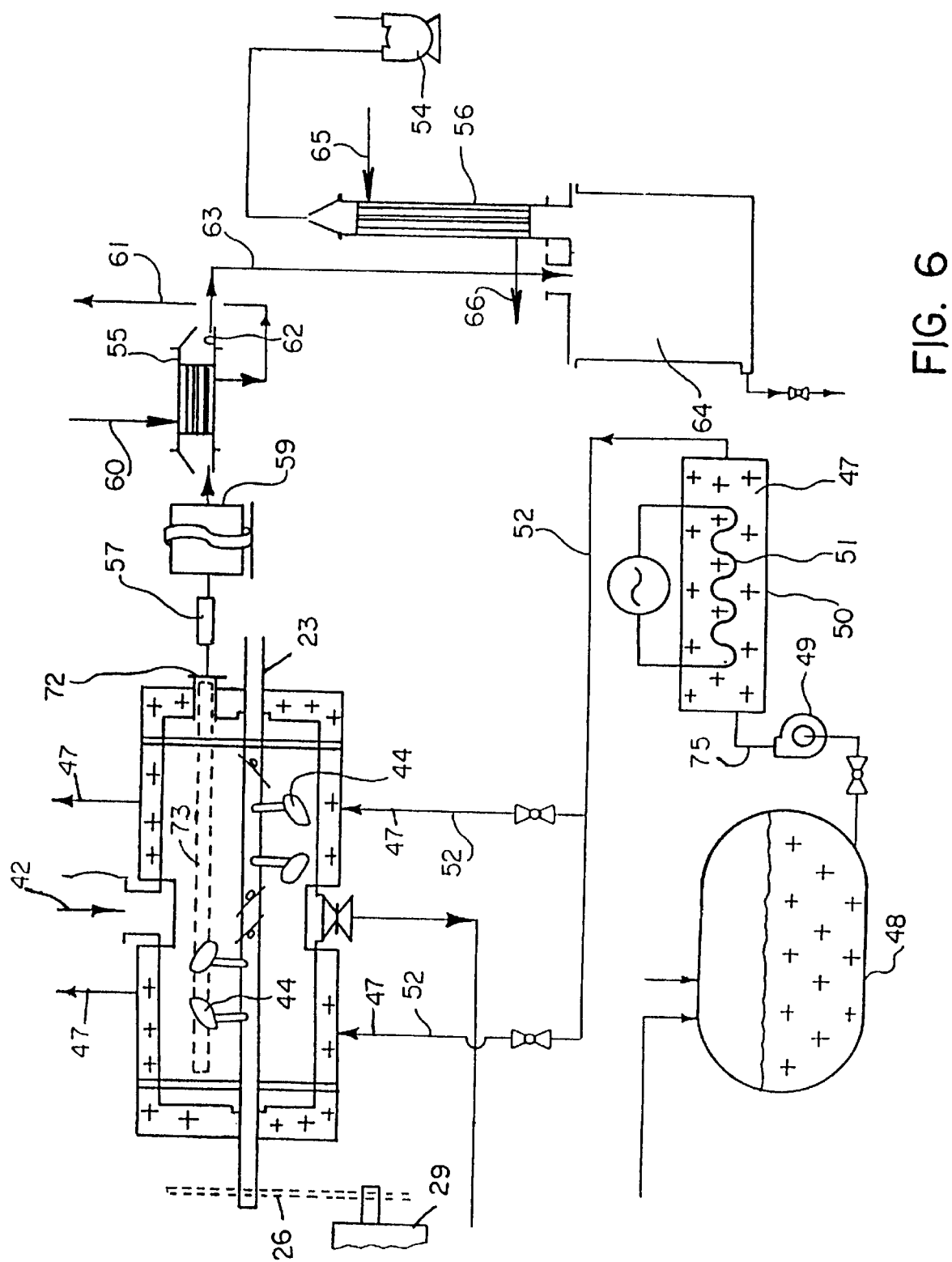

As inner retort drum 11 is elevated in temperature, it is subjected to a lower than ambient pressure by a vacuum pump 54, indicated in FIG. 6, which figure seems to also indicate numerous openings to the atmosphere. The system in fact is closed from the retort drum 11 through the condensers 55 and 56 to vacuum pump 54. Thus, vacuum is applied to the mercury vapor outlet pipe 57 which mates with one of the flanged outlet nipples 72 of retort drum 11.

A dust screen 59 removes suspended solid material from the granulated mass being retorted. (FIG. 6) The mercury vapor then passes through condenser 55, which is cooled by water flowing through inlet and outlet pipes 60 and 61. The inside water passages are all sealed from the mainstream mercury vapor passages, so that the cooling water is not under vacuum. Condenser 55 is asymmetric so that condensed mercury will flow unobstructed from its bottom edge 62, untrapped by any elevational discontinuities. From condenser 55, mercury pipe 63 connects with a liquid mercury receptacle 64, from which the condensed mercury may be extracted, and from which any condensed water may also be removed. A second, vertical, water cooled condenser 56 accepts any vapor from the mercury receptacle 64, cooling water being applied through water pipes 65 and 66. Any remaining mercury vapor is expected to be condensed in this second condenser 56, to flow by gravity back into the mercury receptacle 64.

Figure 2:
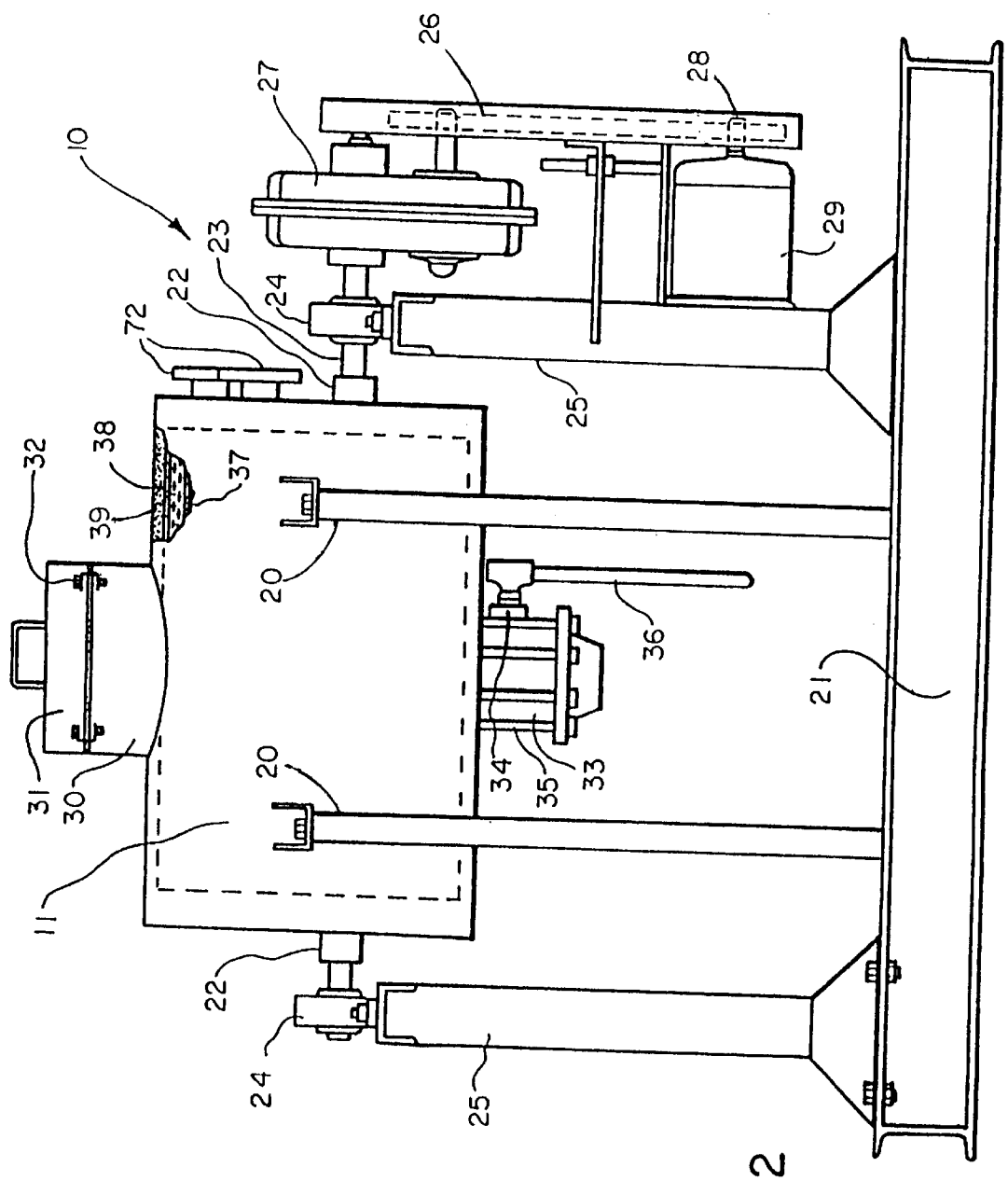

After the mercury vapor is removed from the granulated material in retort drum 11, the vacuum pump is turned off, and the lowermost emptying hatch 33 opened by actuating the handle 36 of ball valve 34, allowing the retorted granulated material 42 to flow from the retort drum 11. (FIG. 2)

As described above, the aforementioned paddles are shaped and positioned so that the granulated material is not only moved upward but is continually circulated toward the center of the retort drum 11 from both ends. This assures that the retort drum is completely emptied of the retorted material before it is recharged for subsequent operation. (FIG. 5)

Figure 7:
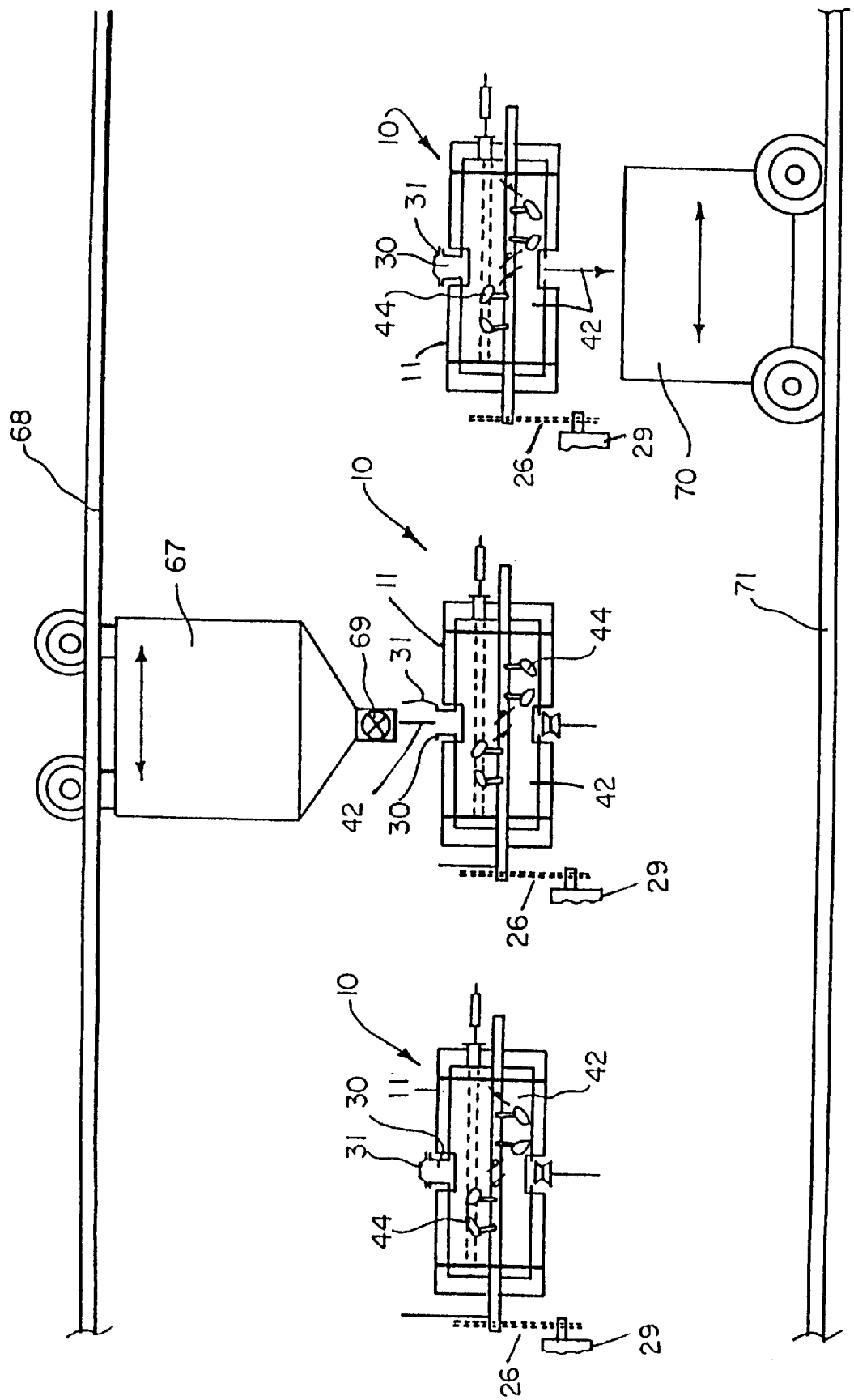

Principally because the retorting material 42 need not be handled in shallow trays, the retorting device 10 is adaptable for use in groups to provide overlapping operational cycles, for continuous retorting and continuous handling of the resulting retorted material. A fragment of one such setup is illustrated in FIG. 7. A large quantity of granulated ore, or ore precipitate, 42, is carried in a supply bin 67 mounted movably upon a track 68 above a row of retorting devices 10. A lowermost valve 69 permits filling of retort drums 11 through filler hatches 30, with lids 31 open. Below the row of retorts 10, a retorted material receptacle 70 is mounted to move along a lower track 71.

In FIG. 7 leftmost retort 10 is illustrated operating, charged with retort material 42, and with drum 11 heated and subjected to lowered pressure, with mercury vapors thus being recovered as previously described.

The next retort 10 to the right is being filled from ore supply bin 67 through open filler hatch 30. The third retort to the right has completed a mercury recovery cycle and is being emptied of spend ore into receptacle 70, for disposal or further processing.

FIG. 7 illustrates only a fragment of continuous retorting setup, which may include as many individual devices 10 as may be necessary for any particular ore or precipitate. Individual retorting times may of course vary with degree of filling with mercury content, degree of granulation, basic composition, size of precipitate, and the like.

The basic continuous retorting setup of FIG. 7 envisions complete heating, vacuuming, condensing and ultimate mercury recovery all as indicated in FIG. 6 and previously described. It is clear, however, that arrangements could be made to heat more than one retort drum at a time or condense the effluent from more than one drum, and the like, if improved efficiency would result. Also, the illustrated method of precipitate delivery could be supplemented with tube delivery systems with screw or disc impellers or the like.

The inventive apparatus may be embodied in other specific forms, and the method in other specific steps, without departing from the spirit or essential characteristics thereof. The present apparatus and method are therefore to be considered illustrative and not restrictive, the scope of the invention being indicated by the appended claims rather than by the foregoing description and all changes which come within the meaning and range of equivalency of the claims are therefore to be embraced therein.

What is claimed and desired to be secured by United States Letters Patent is:

1. A retorting device for recovery of mercury from individual batches of a particulate material, the device comprising:

a closeable container having an uppermost closeable opening for filling the container with a batch of the particulate material and a lowermost closeable opening for emptying the batch of the particulate material from the container, said container being sealable to simultaneously withstand internal pressure below atmospheric and temperatures above the vaporization temperature of mercury;

means for heating said container and the batch of the particulate material within the container;

means for evacuating said container to sub-atmospheric pressure; and means for stirring the batch of the particulate material within said container while heated and evacuated.

2. The retorting device of claim 1, wherein the container can withstand heat of at least as high as 650° F. simultaneously with internal absolute pressure at least as high as nine Torr.

3. The retorting device of claim 1, wherein the stirring means is operable from outside the container and when operating continuously raises successive portions of the batch of the particulate material to the surface thereof.

4. The retorting device of claim 3, wherein the stirring means comprises:

a rotatable shaft extending into the container from the outside thereof; and at least one arm rigidly affixed radially to said shaft within said container extending to stir the batch of the particulate material as the shaft is rotated.

5. The retorting device of claim 4, wherein each arm carries a scoop at a radially outermost end thereof, each of said scoops being configured to raise successive portions of the batch of the particulate material to the surface thereof as the shaft is rotated.

6. The retorting device of claim 5, wherein:

the stirring means comprises at least two arms each carrying a scoop; and the scoops are further configured to urge the batch of the particulate material towards a center of the container from respective ends thereof.

* * * * *